FIG.I.

Dec. 17, 1963    H. D. WRIGHT    3,114,294
MACHINE TOOL ATTACHMENT
Filed March 27, 1962    5 Sheets-Sheet 2
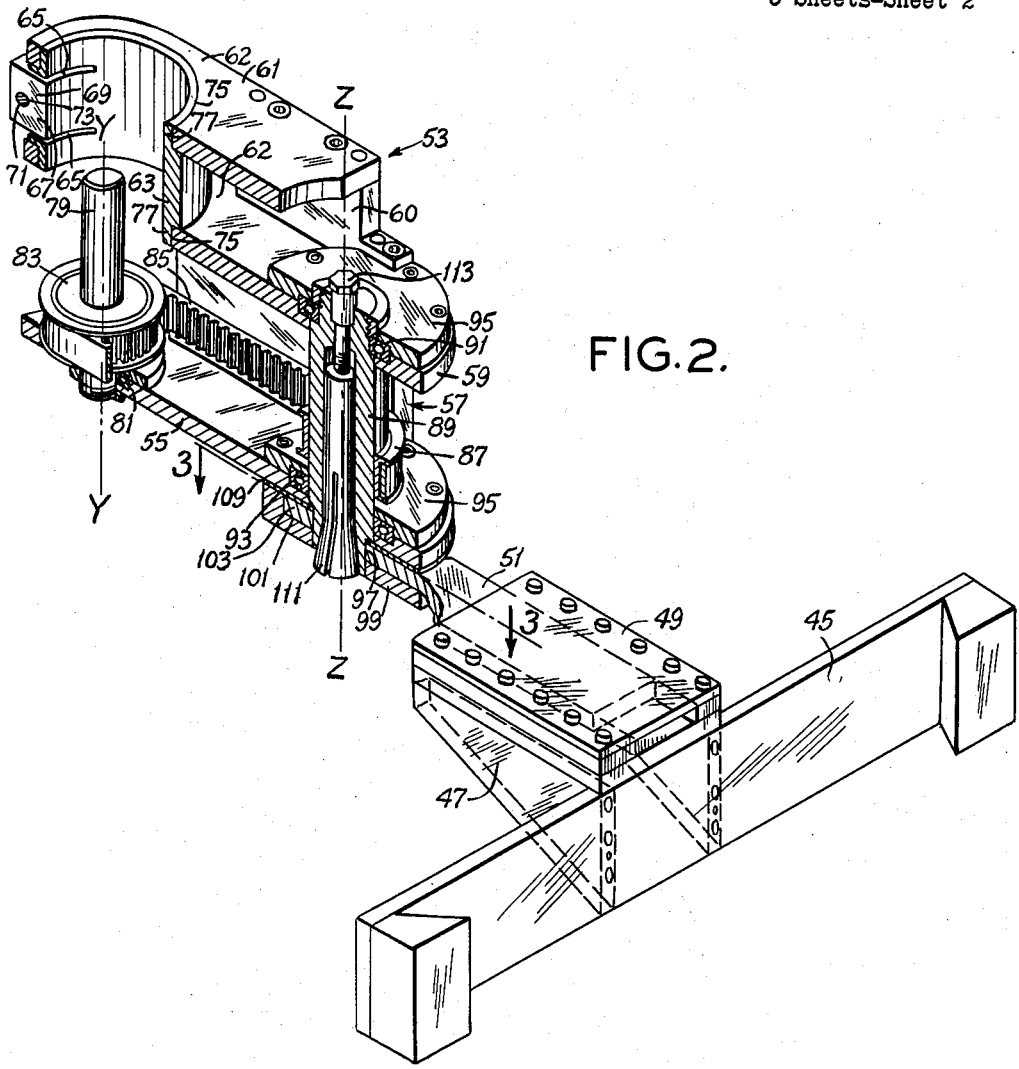
FIG. 2.
FIG. 3.
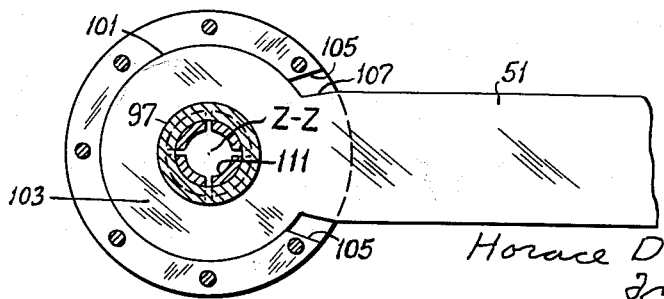
Horace D. Wright,
Inventor.
Koenig, Pope, Senniger and Powers,
Attorneys.

Horace D. Wright,
Inventor.
Koenig, Pope, Senniger and Powers,
Attorneys.

Dec. 17, 1963 H. D. WRIGHT 3,114,294
MACHINE TOOL ATTACHMENT
Filed March 27, 1962 5 Sheets-Sheet 4

Horace D. Wright,
Inventor.
Koenig, Pope, Senniger and Powers,
Attorneys.

Dec. 17, 1963  H. D. WRIGHT  3,114,294
MACHINE TOOL ATTACHMENT
Filed March 27, 1962  5 Sheets-Sheet 5

United States Patent Office 3,114,294
Patented Dec. 17, 1963

3,114,294
MACHINE TOOL ATTACHMENT
Horace D. Wright, Grapevine, Tex., assignor to Texas Instruments Incorporated, Dallas, Tex., a corporation of Delaware
Filed Mar. 27, 1962, Ser. No. 182,883
24 Claims. (Cl. 90—15)

This invention relates to machine tool attachments for cam manufacture or the like, and with regard to certain more specific features, to such an attachment for rotary-head milling machines.

Among the several objects of the invention may be noted the provision of a cam cutting attachment for rotary-head milling machines, whereby the latter may be adapted for the comparatively high-speed, semiautomatic production of suitable smooth cam profiles or the like, requiring a minimum of final dressing by filing or the like; the provision of apparatus of the class described which will cut cam rise and fall profiles having functions which desirably closely follow those of simple harmonic motion; the provision of apparatus of the class described which may readily be mounted and demounted with respect to a rotary-head milling machine without the need to modify its conventional functions; and the provision of apparatus of this class which is simple to construct and of low cost. Other objects and features will be in part apparent and in part pointed out hereinafter.

The invention accordingly comprises the elements and combinations of elements, features of construction, and arrangements of parts which will be exemplified in the constructions hereinafter described, and the scope of which will be indicated in the following claims.

In the accompanying drawings, in which one of various possible embodiments of the invention is illustrated, FIG. 1 is a perspective view showing application of the apparatus comprising the invention to a conventional rotary-head milling machine;

FIG. 2 is an isometric view, partly in section, illustrating the invention;

FIG. 3 is a horizontal detail section taken on line 3—3 of FIG. 2; and

Corresponding reference characters indicate corresponding parts throughout the several views of the drawings.

Heretofore, machinists operating rotary-head milling machines to cut cams thereon were provided with drawings of the cams, to which were attached comparative tables of angles and radial distances for making individual cuts in the cam blank. The tables divided angles and rise and fall distances into finite increments which were fed into the machine by manual control. Each cut on the cam left a jagged surface on the rise and fall portions thereof which needed to be filed smooth and blended into a smooth contour by hand. By means of the attachment of the invention, rise and fall contours on cams may be mechanically generated by continuous tool action, thereby eliminating inaccurate hand filing, so that when the cam is removed from the milling machine it is ready for service. Set-up time is negligible and a cam may be cut in approximately one-quarter to one-half the time previously required for an inferior cam. Bench work after machining is minimized and costs are reduced. A satisfactory attachment made according to the invention can, for example, be built for $1,200.00, as compared with the cost of a special cam cutting machine, which may be on the order of $30,000.00 or more. While the cost of a rotary-head milling machine to which the invention applies is considerable, it is adaptable to other machining operations against which its cost may be charged.

Figure 1:
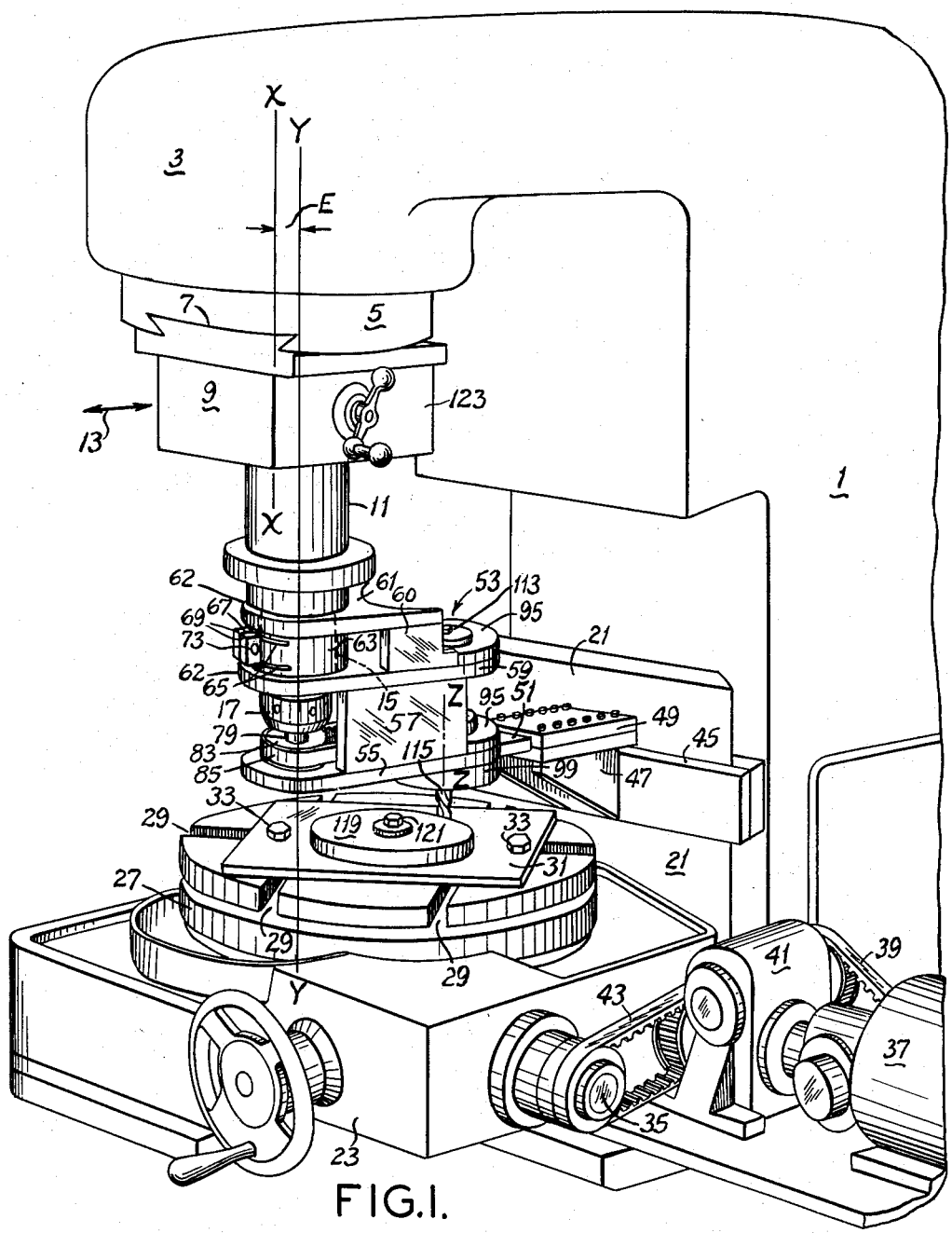

A typical conventional rotary-head milling machine on which the attachment is located is illustrated in FIG. 1. This represents a machine made by the Kearney and Trecker Company of Milwaukee, Wisconsin. Such a machine has a hollow frame part 1 carrying a hollow overhanging head 3 from which a rotary head 5 extends downward around a vertical axis X—X. The head is driven to rotate about this axis by a suitable drive in parts 1 and 3. Splined at 7 to the head 5 is a hollow box 9 from which extends downwardly a vertically movable quill 11. The axis of the quill 11 is lettered Y—Y. By the usual means provided for the purpose (not shown), the box 9 may be adjusted back and forth on the head 5 in a horizontal direction, as suggested by the double dart 13. By this means the axis Y—Y of the quill 11 may be variably offset with respect to the center line X—X. Therefore, the quill 11 with its axis Y—Y may revolve about the axis X—X when the rotary head 5 revolves.

The quill 11 terminates in a lower open-end sleeve 15. From this lower end 15 extends a chuck 17. The usual function of this chuck 17 is for attachment of the spindle of the usual live milling cutter, but that is not its use with the present attachment. The chuck 17 rotates on axis Y—Y. It is driven from box 9 by the usual drive (not shown) extending through the quill 11. Whenever the quill 11 moves up or down, the chuck moves with it. When the quill 11 revolves with its axis Y—Y around axis X—X, the chuck 17 revolves with it. However, the chuck is driven to revolve on axis Y—Y in any revolved and elevated position of the quill 11. Thus it will be seen that by a rotary-head milling machine is herein meant one in which a quill such as 11 on an eccentric axis such as Y—Y moves about an offset axis X—X, and that from this quill 11 extends a live chuck such as 17, rotatable on the eccentric axis Y—Y and moving about axis X—X.

Rotary-head milling machines are also provided with suitable controllable variable-speed drives whereby speed of rotation of the chuck 17 on its axis Y—Y may be controlled independently of the speed of the rotary head 5 around axis X—X. Thus according to the known operation of the milling machine, the speed of the chuck 17 on axis Y—Y is independently controllable with respect to the speed of the revolution of the quill 11 around axis X—X; the quill 11 and chuck 17 may be raised and lowered; and the eccentricity E between axes X—X and Y—Y may be changed. The slidable box 9 on the rotary head 5 in effect provides what will hereinafter be referred to below as a crank arm having the variable eccentricity E. In addition to the parts above described, the usual rotary-head milling machine includes on its frame 1 a vertical guide 21 for a vertically adjustable table 23 controllable in elevation. It is common practice to mount on such a table a rotary table 27 having suitable T-head slots such as 29, by means of which work support plates such as 31 may be bolted into place (see bolts 33). A rotary table such as 27 is usually made rotary by a suitable drive from a shaft such as shown at 35. According to the present invention, I provide for driving the shaft 35 a constant-speed motor 37, having a positive belt drive 39 to an electrical variable-speed reducer 41 which in turn is connected through positive belt drive 43 with the shaft 35. By suitable variation of the excitation of the speed change unit 41, the speed of shaft 35 may be controlled. Thus the speeds of rotation of the table 27, chuck 17 and revolutions of quill 11 may be adjusted in any desired ratio.

In FIG. 2 are shown the primary elements of my new attachment applicable to the above known parts. The attachment consists of a crosshead 45 adapted for vertically adjustable sliding movement on the fixed vertical guide 21 of the milling machine 1. The crosshead 45 has brackets 47 which support a transverse guide 49. The guiding action of the second guide 49 is perpendicular to that of the first guide 21. At 51 is shown a slider movable in the transverse guide 49.

At numeral 53 is shown an assembly consisting of a base plate 55 connected by spaced walls 57 with an intermediate plate 59. Plate 59 is connected with a top plate 61 by spaced walls 60. The plates 59 and 61 are formed with overhangs 62. As will be shown below, the assembly 53 has the kinematic effect of a coupler link which will be designated L (see FIGS. 4–8). The assembly 53 is also a carriage for the parts thereon. At numeral 63 is shown a brass clamp ring, slotted as shown at 65 and 67 to provide ears 69 in which are openings 71 for a bolt 73, whereby the ring 63 may be slipped up over and clamped to the lower end portion 15 of the quill 11. In this position it forms a pivot bearing for the assembly 53, the overhangs 62 of plates 59 and 61 being provided with openings 75 surrounding stepped end portions 77 of the clamp ring 63. The openings 75 being such that the plates 59 and 61 are rotatable on the clamp ring 63, the entire assembly 53 is in effect pivoted to the quill 11 around the clamp ring 63 when the latter is telescoped with and clamped to the quill 11. Line Y—Y represents the pivot axis.

At 79 is shown a drive spindle having a free upper end for insertion into the chuck 17 when the clamp ring 63 is telescoped upon and attached to the quill 11. After insertion, the chuck 17 is tightened, so that when the chuck is rotated, the spindle 79 becomes live. The spindle 79 is supported in bearing 81, carried in the lower plate 55. Its axis is collinear with the axis of the bearing ring 63 and hence also with axis Y—Y when the ring 63 is placed on the quill 11.

Attached to the shaft 79 is a toothed sheave 83 for a positive drive belt 85. The belt extends to toothed sheave 87 affixed to a rotary sleeve or tool-carrying spindle 89. Spindle 89 is borne in an upper bearing 91 in plate 59, and in a lower bearing 93 in the plate 55. Holding caps for the bearings 91 and 93 are shown at 95. The lower end of the sleeve 89 is stepped to provide an interiorly conical extension 97. This passes through a lower bearing plate 99 attached to plate 55. The plate 99 has a circular cupped portion 101 (see FIG. 3) for the reception of an annular eye portion 103 of the slider 51. The eye 103 surrounds the lower end 97 of the sleeve 89. The cup-shaped portion 103 opens laterally as shown at 105 to accept a necked portion 107 of the slider 51. A bearing shim 109 is located between the bottom surface of the plate 55 and the flush top surfaces of the annular end 103 and of the member 99. Thus a substantial pivoting action is accommodated between the slider 51 and the assembly 53. Attached to the outside of the spindle 89 is the toothed sheave 87 with which the positive drive belt 85 engages.

Inside of the spindle 89 is a split collet 111, adapted to be drawn into a gripping position by a draw screw 113. The collet is adapted to receive the shank of a suitable milling cutter such as shown at 115 in FIG. 1. Therefore, the axis of rotation of this cutter 115 is coaxial with the pivot axis between slider 51 and the housing 53 (see line Z—Z).

Thus it will be seen that the shaft 79, when made live by its drive from the chuck 17, will rotate the spindle 89 through the positive belt drive 85. The pitch diameters of both sheaves 83 and 87 are preferably, though not necessarily, the same, so that a 1:1 driving ratio is obtained. Inasmuch as the speed of the chuck 17 may be independently controlled through the usual mechanism provided for the purpose in the milling machine, the speed of rotation of the milling tool 115 may accordingly be controlled when the assembly 53 is attached thereto.

Referring to FIG. 1, the mounting of the attachment shown in FIG. 2 for cutting a cam will now be described. With the table 23 adjusted down on the guide 21, the crosshead 45 is applied to the guide from its top. The slider 51 is inserted into the transverse guide 49 and the housing assembly 53 swung into position, so that the ring 63 may be telescoped up over the lower end 15 of the quill 11, the clamp bolt 73 being tightened. As this telescoping application is performed, the free end of the spindle 79 enters the chuck 17, which is then adjusted in the usual manner to grip it. The shank of the milling cutter 115 is inserted into the collet 111 and screw 113 drawn up to cause the collet to grip the cutter shank. A cam blank 119 is mounted on the work plate 31, being held centrally by a fastener 121, being preferably shimmed up centrally on its underside so as to leave some space between it and the work plate 31. Then the table 23 may be raised and/or the quill 11 lowered. In the latter event the crosshead 45 slides down on the guide 21. Adjustment in elevations is such that the cutter 115 reaches across the sides of blank 119, its spacing from work plate 31 permitting this.

Cutting operations will best be understood from FIGS. 4–8, in which K represents the effective crank arm, the length of which is determined by the eccentricity E between center lines or axes X—X and Y—Y. Length L represents the coupler link formed by the housing assembly 53 between axis Y—Y (of chuck 17 and quill 11) and axis Z—Z (of the milling cutter 115). The slider 51 and guide 49 are represented diagrammatically.

Cross-hatching represents fixed constraint after the attachment has been set up as represented in FIG. 1. The constraint between slider 51 and its guide 49 is such that the axis Z—Z is translated in a fixed vertical plane R containing the fixed vertical axis X—X. The table 23 is adjusted in the usual way so as to place that which is to be the center of the cam in the plane R. The desired eccentricity E for determining the crank length K is obtained by the usual adjustment of the control box 123 on the head 5.

Figure 4:
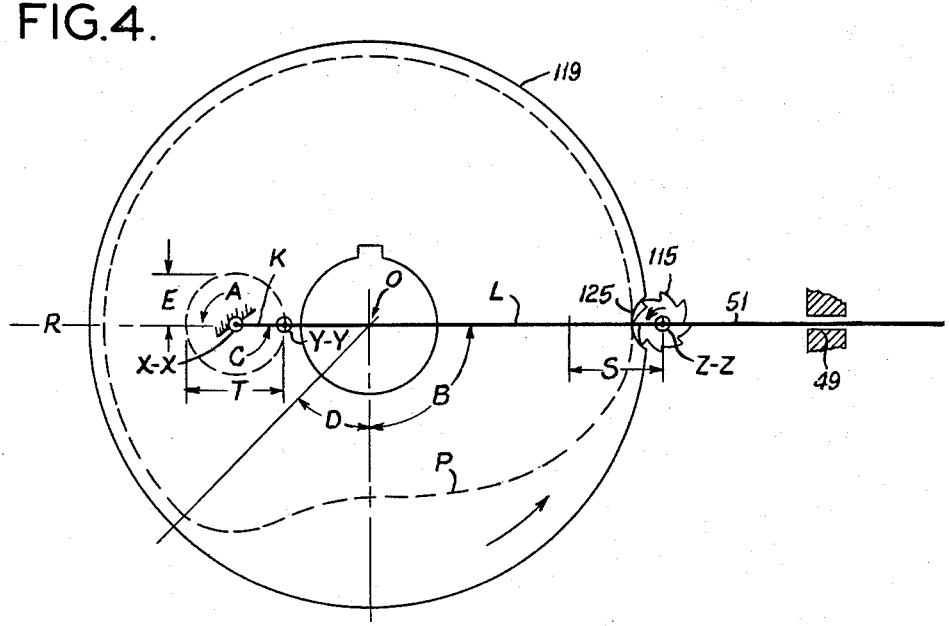
FIGS. 4–8 are kinematic skeleton diagrams illustrating the motions which occur during a typical cam cutting operation performed by the apparatus when attached to a rotary head milling machine.

To start, the head 5 is rotated until the axis Y—Y is in the plane R (FIG. 4). Next the controls on the milling machine are set so that the chuck 17 is driven, which results in driving the cutter 115 through the shaft 79, sheaves 83 and 87, and the belt 85. Then the table 23 is moved inward until the center O of the blank is in proper position in which the cutter notches into the blank, as shown at 125, a distance corresponding to the maximum radius on the cam to be made. The proposed cam is shown by closed dotted line P. It is to have an approximately simple harmonic fall over a cam motion angle B of 90°. It is then to have an approximately simple harmonic rise over a cam motion angle D of 45°. To accomplish this, the speed inputs are arranged so that for a 180° angle A of turning of the head 5 (and crank K) the blank 119 will first turn the 90° angle B. Positions of parts before starting rotation of the crank K and of the cam blank, after the notch 125 has been cut, are shown in FIG. 4. The throw of the crank K (and axis Y—Y) is designated as T. The throw of the center of line Z—Z of the cutter 115 is of an equal amount, represented by S (compare FIGS. 4 and 6).

Figure 5:
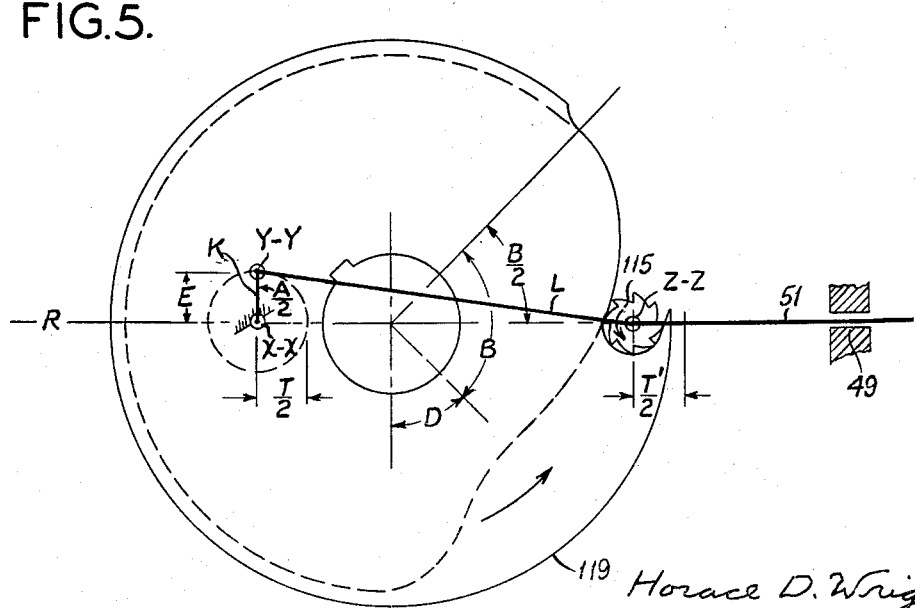

FIG. 5 shows the operation in which, during a given time, crank K has moved through 90° or $$\frac{A}{2}$$

and the cam blank has moved 45° or $$\frac{B}{2}$$

The speed reducer 41 has been set to provide the appropriate 45° blank movement while the crank K moves through 90°. The distance $$\frac{T}{2}$$

indicates the retractive movement of line Y—Y and the distance $$\frac{T'}{2}$$

represents the retractive movement of the cutter. While these distances are not exactly equal, they are nearly so because of the large ratio of the coupler length L to the crank length K. The greater this ratio, the closer will the motion of line Z—Z approximate simple harmonic motion of the type desired.

Figure 6:
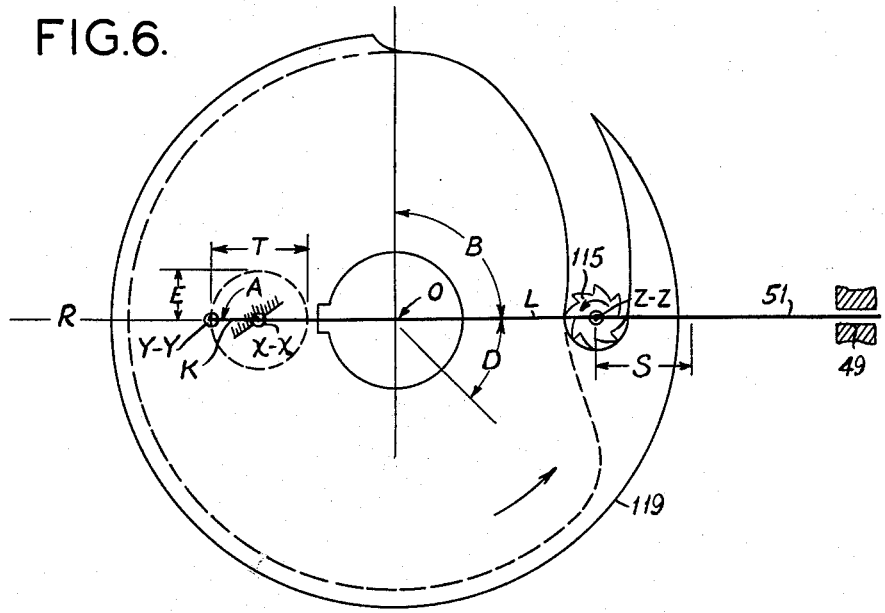

FIG. 6 shows the result of advance of the crank K through 180° as the cam blank completes its 90° movement, whereby the profile of fall of the cam is completed. The cam has turned through 90° while the crank K turned through 180°.

Figure 7:
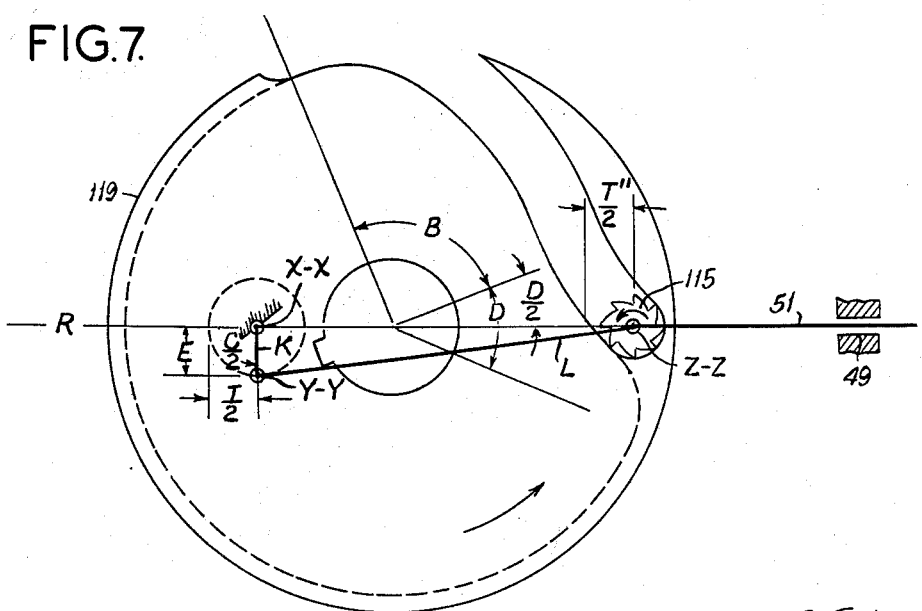

Rise is to take place with simple harmonic motion throughout 45°, represented by angle D. In FIG. 7 the cut for one-half of this rise has occurred, wherein the crank K has turned through angle $$\frac{C}{2}$$

equal to 90° and the cam blank has turned through angle $$\frac{D}{2} = 22\frac{1}{2}°$$

The one-half return displacement of center Y—Y is $$\frac{T}{2}$$

whereas the corresponding return displacement of center line Z—Z is $$\frac{T''}{2}$$

Again $$\frac{T''}{2}$$

closely approximates $$\frac{T}{2}$$

or a distance corresponding approximately to the desired simple harmonic motion.

Figure 8:
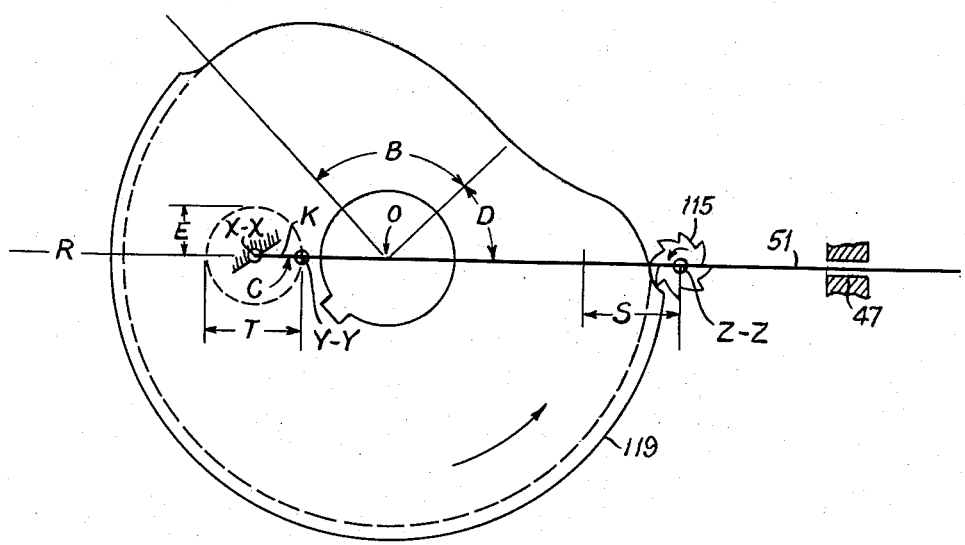

In FIG. 8 completion of the cam rise is illustrated, wherein the lines Y—Y and Z—Z have returned to their initial positions and the fall and rise parts of the cam completed. At this time the rotation of the head 5 is stopped. This leaves the rotating cutter in the position shown in FIG. 8. The drive to the blank 119 is allowed to continue from motor 37 through the speed control 41, which will complete the circular profile of the cam, which is outlined by the circular dotted line in FIG. 8. If desired, the circular cutting may be accelerated by changing the speed of blank rotation from the speed control 41. The speed of rotation of the cutter 115 may or may not be changed.

It will be observed that the amount of follower rise or fall developed by the cam will be determined by the amount of eccentricity E adjusted into the crank K. Such adjustment can be inserted in the usual way in the milling machine mechanism during the time that the cam blank is backed away from the cutter 115. Such backing off is required whenever a new adjustment for eccentricity is required. In the example above given this was not necessary, since E was the same for both fall and rise. After any adjustment is made, the blank is brought back into position tangent to the cutter before proceeding with the cut.

It will be seen that the throw of the crank K is 180° for each rise or fall profile of the cam, regardless of the cam angle subtended by such profile, the desired cam angle being obtained by adjusting the speed of the reducer 41 in proper relation to the speed of rotation of the rotary head 5 of the milling machine. The speed of the head 5 is itself independently controllable from the usual milling machine control.

It will be appreciated that a blank may be circularly trimmed whenever desired by holding K fixed at any desired position while continuously rotating the table 27. The partial grooves shown in FIGS. 6 and 7 suggest that if it is desired to cut a completely grooved plate cam, this can be accomplished on a blank having a sufficient radius, the end of the cutter extending only part-way into the blank. The result will be a grooved, or positive-motion plate cam.

The cams thus far described are known as plate cams. Barrel cams may also be cut by the attachment in a manner which it is believed will be obvious to those skilled in the art, except to state that the appropriate cylindric blank will be mounted on a horizontal axis in the plane R and driven to rotate by a suitable drive.

Advantages of the invention include the improved facility with which cams may be semiautomatically smoothly cut on a rotary-head milling machine. Each rise and fall curve is cut with a continuous motion during the time that the crank K rotates 180°. Successive rise and fall curves involving no change in eccentrically E may be cut by continuous action during which crank K turns through 360°. If the eccenrticity E is changed between successive rise or fall cuts, only one break in cutter contact is required between the respective cuts therefor.

In view of the above it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A machine tool attachment comprising a carriage, a rotatable bearing ring therein, means adapted to attach said bearing ring to an eccentrically movable quill of the machine tool, a rotary drive spindle supported in said carriage in coaxial arrangement with said bearing ring, said spindle having a portion adapted for insertion into a machine tool chuck coaxially associated with said quill, a tool-carrying spindle rotatably mounted in said carriage in spaced relation to the drive spindle, drive means between said spindles, and a slide member rotatable on said carriage around an axis which is collinear with the axis of rotation of the tool-carrying spindle.

2. An attachment according to claim 1, wherein said drive means between spindles is constituted by a belt and pulley drive.

3. A machine tool attachment according to claim 1, wherein said tool-carrying spindle is hollow and includes a collet therein for tool attachment.

4. A machine tool attachment according to claim 3, wherein said drive means is constituted by a belt drive between the spindles.

5. A machine tool attachment according to claim 1, wherein said means for attaching the bearing ring is constituted by springy portions of the ring separated therefrom by slots, said springy portions having bolting apertures and a draw bolt in said apertures.

6. A machine tool attachment according to claim 5, wherein said tool-carrying spindle is hollow and includes a collet therein for tool attachment.

7. A machine tool attachment according to claim 6, wherein said drive means is constituted by a belt drive between the spindles.

8. A machine tool attachment comprising a carriage having lower and upper portions, a rotatable bearing ring in said upper portion, means adapted to attach said bearing ring to a revolving quill of the machine tool, a rotary drive spindle supported on the lower portion of the carriage in coaxial relationship with said bearing ring, said spindle having a free end portion for insertion into a machine tool chuck coaxially associated with said quill, a tool-carrying spindle rotatably mounted in said carriage in spaced relation to the drive spindle, drive means between said spindles, and a slide member rotatable on said carriage around an axis which is collinear with the axis of rotation of the tool-carrying spindle.

9. A machine tool attachment comprising a carriage having a lower member supporting an upper member, the latter having a part overlying a part of the lower member, a rotatable bearing ring in said overlying part, means for attaching said bearing ring to a revolving quill of the machine tool, a rotary drive spindle supported on said lower member in coaxial arrangement with said bearing ring, said spindle having a free end portion for insertion into a machine tool chuck coaxially associated with said quill, a tool-carrying spindle rotatably mounted in said carriage in spaced relation to the drive spindle, belt drive means between said spindles, and a slide member rotatable on said carriage around an axis which is collinear with the axis of rotation of the tool-carrying spindle.

10. A machine tool attachment according to claim 9, wherein said means for attaching the bearing ring is constituted by springy portions of the ring separated therefrom by slots and containing openings for a draw bolt.

11. A machine tool attachment according to claim 10, wherein said tool-carrying spindle is hollow and includes a collet therein for tool attachment.

12. A machine tool attachment comprising a carriage, a rotatable bearing ring therein, means adapted to attach said bearing ring to an eccentrically movable quill of the machine tool, a rotary drive spindle supported in said carriage in coaxial arrangement with said bearing ring, said spindle having a portion adapted for insertion into the machine tool chuck which is coaxially associated with said quill when said bearing ring is attached to said quill, a tool-carrying spindle rotatably mounted in said carriage in spaced relation to the drive spindle, drive means between said spindles, a slider rotatable on said carriage around an axis which is collinear with the axis of rotation of the tool-carrying spindle, a guide member engageable with said slider, and a transverse slide member attached to said guide member adapted for sliding engagement with a guide on said machine tool.

13. A cam cutting attachment for a rotary-head milling machine having a frame determining an axis of rotation for said head, a variable-speed rotary work support, a variable-speed live chuck, and eccentric means mounting said live chuck on the head at a variable distance from said axis; said attachment comprising a guide adapted for connection with said frame, a slider in said guide, a coupler assembly having a first pivot means connecting it around the axis of said live chuck and a second pivot means connecting it with said slider, a rotatable tool shaft coaxial with said second pivot means, and drive means connecting said live chuck and said tool shaft.

14. A cam cutting attachment according to and for the use set forth in claim 13, wherein said slider moves to drive the axis of the tool shaft in a plane containing the axis of the rotary head.

15. A cam cutting attachment for a rotary-head milling machine having a frame determining an axis of rotation for said head, a variable-speed rotary work support, a quill extending from the rotary head, a variable-speed live chuck coaxial with the quill, and eccentric means mounting said coaxial quill and chuck on the head at a variable distance from said axis; said attachment comprising a guide adapted for connection with said frame, a slider in said guide, a coupler assembly having a first pivot means connecting it with said quill and a second pivot means connecting it with said slider, a rotatable tool shaft coaxial with said second pivot means, and drive means connecting said live chuck and said tool shaft.

16. A cam cutting attachment according to and for the use set forth in claim 15, wherein said member supporting the slider guides it so that said second pivot means moves in a plane containing said axis of rotation of said rotary head.

17. A cam cutting attachment for a rotary-head milling machine having a frame determining an axis of rotation for said head, a variable-speed rotary work support, a quill variably extensible from the rotary head, a variable-speed live chuck coaxial with the quill and also variably extensible from said head, and eccentric means mounting said coaxial quill and chuck on the head at a variable distance from said axis; said attachment comprising a member guided in one direction on said frame, a transverse slider supported in said member, a coupler assembly having a first pivot means connecting it with said quill and a second pivot means connecting it with said slider, a rotatable tool shaft coaxial with said second pivot means, and drive means connecting said live chuck and said tool shaft.

18. A cam cutting attachment for a rotary-head milling machine having a frame which carries a drive, a first guide and a variable-speed rotary work support, a quill extending axially and variably from the rotary head parallel to the guide and a variably extensive live chuck coaxial therewith, and variable eccentric means mounting said quill and live chuck on the rotary head at a distance from the axis of rotation of said head; said attachment comprising a transverse guide adapted for movement on said first guide, a slider in said transverse guide, a coupler assembly having a first pivot means connecting it with said quill and a second pivot means connecting it with said slider, a rotatable tool shaft extending through said second pivot means, and drive means connecting said live chuck and said tool shaft, the plane of movement of the slider containing said axis of rotation.

19. A cam cutting attachment according to and for the use set forth in claim 18, wherein said drive means between the live chuck and said tool shaft is constituted by a flexible connector extending around circular members connected to said live chuck and tool shaft respectively.

20. A cam cutting attachment according to and for the use set forth in claim 18, wherein said drive means between the live chuck and said tool shaft is constituted by sheaves connected therewith respectively and a connecting belt therebetween.

21. A cam cutting attachment according to and for the use set forth in claim 20, wherein said sheaves and the belt are of the toothed positive drive type.

22. A cam cutting attachment for a rotary-head milling machine having a frame determining an axis of rotation for said head, a variable-speed rotary work support, a quill extending from the rotary head, a variable-speed live chuck coaxial with the quill, and eccentric means mounting said coaxial quill and chuck on the head at a variable distance from said axis; said attachment comprising a guide adapted for connection with said frame, a slider in said guide, a coupler carriage having a clamp therein adapted to connect and pivot it with said quill, a rotary spindle carried in the carriage and centered with said pivot, said spindle adapted for reception in said chuck, and a pivot means connecting the carriage with said slider, a rotatable tool shaft coaxial with said pivot means, a tool-holding collet in said tool shaft, and drive means connecting said live chuck and said tool shaft.

23. A cam cutting attachment according to and for the use set forth in claim 22, wherein said drive means is constituted by sheaves on said spindle and tool shaft respectively and connected by a belt.

24. A cam cutting attachment according to and for the use set forth in claim 23, wherein said slider guides said tool shaft to move in a plane which includes said axis of rotation of said rotary head.

References Cited in the file of this patent

UNITED STATES PATENTS

| | | |
|---|---|---|
| 551,841 | Spoerl | Dec. 24, 1895 |
| 2,605,677 | Armitage | Aug. 5, 1952 |
| 2,958,264 | Burt | Nov. 1, 1960 |